United States Patent
Afifi et al.

(10) Patent No.: US 8,259,910 B2
(45) Date of Patent: Sep. 4, 2012

(54) METHOD AND SYSTEM FOR TRANSCRIBING AUDIO MESSAGES

(75) Inventors: Sammy S. Afifi, Solana Beach, CA (US); Gerald J. Marolda, III, Holualoa, HI (US)

(73) Assignee: VoiceCloud, San Diego, CA (US)

( * ) Notice: Subject to any disclaimer, the term of this patent is extended or adjusted under 35 U.S.C. 154(b) by 1209 days.

(21) Appl. No.: 12/049,153

(22) Filed: Mar. 14, 2008

(65) Prior Publication Data

US 2009/0232284 A1    Sep. 17, 2009

(51) Int. Cl.
- *H04M 11/00* (2006.01)
- *H04L 12/58* (2006.01)
- *G06Q 30/00* (2012.01)
- *G10L 15/26* (2006.01)

(52) U.S. Cl. ......... 379/88.14; 704/9; 704/201; 704/235; 704/270; 704/271; 705/1.1; 705/67; 709/206; 713/153; 715/200; 725/135

(58) Field of Classification Search ............... 379/88.14; 704/9, 201, 235, 270, 270.1, 271; 705/1.1, 705/67; 709/206; 713/153; 715/200

See application file for complete search history.

(56) References Cited

U.S. PATENT DOCUMENTS

| | | | |
|---|---|---|---|
| 5,283,818 A | 2/1994 | Klausner et al. | |
| 5,572,576 A | 11/1996 | Klausner et al. | |
| 6,230,199 B1 | 5/2001 | Revashetti et al. | |
| 6,249,808 B1 * | 6/2001 | Seshadri | 709/206 |
| 6,980,953 B1 * | 12/2005 | Kanevsky et al. | 704/235 |
| 7,016,844 B2 * | 3/2006 | Othmer et al. | 704/270.1 |
| 7,072,684 B2 | 7/2006 | Gusler et al. | |
| 7,133,899 B2 * | 11/2006 | Rowe | 709/206 |
| 7,783,486 B2 * | 8/2010 | Rosser et al. | 704/270 |
| 7,853,863 B2 * | 12/2010 | Sakai | 715/200 |
| 8,010,366 B1 * | 8/2011 | Kearby et al. | 704/271 |
| 2002/0194142 A1 * | 12/2002 | Coffey | 705/67 |
| 2003/0149574 A1 * | 8/2003 | Rudman | 705/1 |
| 2006/0053470 A1 * | 3/2006 | Colter et al. | 725/135 |
| 2006/0069546 A1 * | 3/2006 | Rosser et al. | 704/9 |
| 2006/0223502 A1 | 10/2006 | Doulton | |
| 2009/0113204 A1 * | 4/2009 | Raniere | 713/153 |
| 2009/0232284 A1 * | 9/2009 | Afifi et al. | 379/88.14 |
| 2009/0234643 A1 * | 9/2009 | Afifi et al. | 704/201 |

* cited by examiner

Primary Examiner — Gerald Gauthier (57) ABSTRACT

A transcribing method may include receiving an audio message from a customer via a telephone, determining whether one of the agent transcribers is available, storing the audio message when an agent transcriber is not available, continuing to determine whether a transcriber is available, streaming in real time a streamed portion of the audio message to a first available agent transcriber for facilitating the transcription of the streamed portion of the audio message into a first portion of a transcription text file, providing subsequently a pre-streamed recorded portion of the audio message to a subsequently available second agent transcriber for facilitating the transcription of the pre-streamed recorded portion of the audio message into a second portion of the transcription text file while the streaming in real time is continuing with the first agent transcriber, and combining the first and second portions of the transcription text file into a consolidated text file.

One embodiment of the system and method relates to streaming in one portion of the audio message to a first available agent transcriber for transcription purposes, and to providing a pre-streamed recorded portion of the same audio message to a subsequently available second agent transcriber to provide rapid transcription of the audio message.

22 Claims, 6 Drawing Sheets

METHOD AND SYSTEM FOR TRANSCRIBING AUDIO MESSAGES

FIELD OF THE INVENTION

The present invention relates in general to a method and system for transcribing audio messages. It more particularly relates to a method and system for providing real-time transcribing of voice messages over a telephone system.

BACKGROUND ART

There is no admission that the background art disclosed in this section legally constitutes prior art.

There have been a variety of transcription systems and methods. For example, reference may be made to U.S. Pat. Nos. 5,283,818; 5,572,576; 6,230,199; and 7,072,684, and to United States Patent Application Publication No. 2006/0223502.

A conventional transcription service system waits until an audio file is recorded, and then transmits a copy of the audio file to the system, which then connects the audio file to a transcriber. The transcribed text is then sent back to the system, which either stores the transcribed text file and/or notifies the user via short message service (SMS), text message, email, or others. Such a system induces delays in receiving by the user the transcribed text for the audio message.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings, wherein.

DETAILED DESCRIPTION OF CERTAIN EMBODIMENTS OF THE INVENTION

It will be readily understood that the components of the embodiments as generally described and illustrated in the drawings herein, could be arranged and designed in a wide variety of different configurations. Thus, the following more detailed description of the embodiments of the system, components and method of the present invention, as represented in the drawings, is not intended to limit the scope of the invention, as claimed, but is merely representative of the embodiments of the invention.

A transcription system and method for use in a variety of applications, including business, legal, medical, voicemail, and others, are disclosed. The transcription system may include a telephony server, an audio broadcast server, a computer server, and a plurality of agent transcribers. The system may allow the real-time transcription of an audio message from a caller by streaming the message to an agent transcriber, which may then transcribe the message into text in real-time. The real time streaming enable a rapid transcription to be made available to the caller.

One embodiment of the system and method relates to streaming in one portion of the audio message to a first available agent transcriber for transcription purposes, and to providing a pre-streamed recorded portion of the same audio message to a subsequently available second agent transcriber to provide rapid transcription of the audio message.

In accordance with certain embodiments of the present invention, there is provided a transcription method for facilitating the transcription of audio messages by a group of agent transcribers. The method may include receiving an audio message from a customer via a telephone, determining whether one of the agent transcribers is available, storing the audio message when an agent transcriber is not available, continuing to determine whether a transcriber is available, streaming in real time a streamed portion of the audio message to a first available agent transcriber for facilitating the transcription of the streamed portion of the audio message into a first portion of a transcription text file, providing subsequently a pre-streamed recorded portion of the audio message to a subsequently available second agent transcriber for facilitating the transcription of the pre-streamed recorded portion of the audio message into a second portion of the transcription text file while the streaming in real time is continuing with the first agent transcriber, and combining the first and second portions of the transcription text file into a consolidated text file.

According to a disclosed embodiment of the invention, there is provided a transcription system for facilitating the transcription of audio messages by a group of agent transcribers including means for receiving an audio message from a customer via a telephone, means for determining whether one of the agent transcribers is available, means for storing the audio message when an agent transcriber is not available, means for continuing to determine whether a transcriber is available, means for streaming in real time a streamed portion of the audio message to a first available agent transcriber for facilitating the transcription of the streamed portion of the audio message into a first portion of a transcription text file, means for providing subsequently a pre-streamed recorded portion of the audio message to a subsequently available second agent transcriber for facilitating the transcription of the pre-streamed recorded portion of the audio message into a second portion of the transcription text file while the streaming in real time is continuing with the first agent transcriber, and means for combining the first and second portions of the transcription text file into a consolidated text file.

The transcription system and method may allow subscribers/users to manage multiple sources of audio to be immediately transcribed, such as dictation, voicemails, podcasts, audio notes, etc. The subscriber/user may have the ability to select what type of transcription, translation, or captioning is to be performed. To achieve real-time voice to text transcription, transcription agents/technicians may be notified and provided access to the message to transcribe and/or translate it, while the subscriber/user is speaking. The transcribed text file may then be provided to the subscriber/user immediately after the subscriber/user completes their message.

The transcription system and method may further be capable of receiving and storing audio files for the purpose of immediate transcription and/or translation and then sent back to the subscriber/user. These stored audio files may also be transcribed in different speech blocks by different transcribers for security and/or speed.

To overcome the delay of the typical transcription systems, an incoming audio message may be transcribed by an agent as the message is being received into the system as a caller's voicemail to the subscriber/user (customer) or as dictation by the customer. By the time the caller/customer ends the message by terminating the call/connection, the audio message may be already transcribed and may be delivered immediately to the customer.

When the customer establishes a connection to transmit dictation or a caller establishes a connection to leave a message for the customer, an available agent may be selected based on the customer's preferences such as, language for example. The call may be monitored by the transcription agent without the customer/caller being aware of the agent's presence. As the customer/caller is leaving the dictation/message, the transcription agent may transcribe the real-time audio into text in real-time into a transcribed text file.

The transaction may be given a unique identification number, so that the transcribed text file may be tied to the audio message left by the customer/caller. Upon termination of the call by the customer/caller, the transcribed text file may be submitted by the agent into the transcription system and stored in a transaction database with the unique transaction identification number. The transcription system may also save the recorded audio to an audio file that may be logged into the transaction database with the same transaction identification number as the transcribed text file. The customer may then be able to receive their transcribed text file and audio file immediately after the message has been dictated to the agent.

If no appropriate transcription agents are available at the time of the call, the message may be recorded and stored in an audio file in the transaction database of the transcription system and be available for the customer to access. The recorded audio file may also be placed in a queue database until an agent is available to download the message, transcribe it, and send the transcribed text file back to the system where it is placed in the transaction database with the audio file. One or more transcription agents may complete this transcription.

Figure 1:
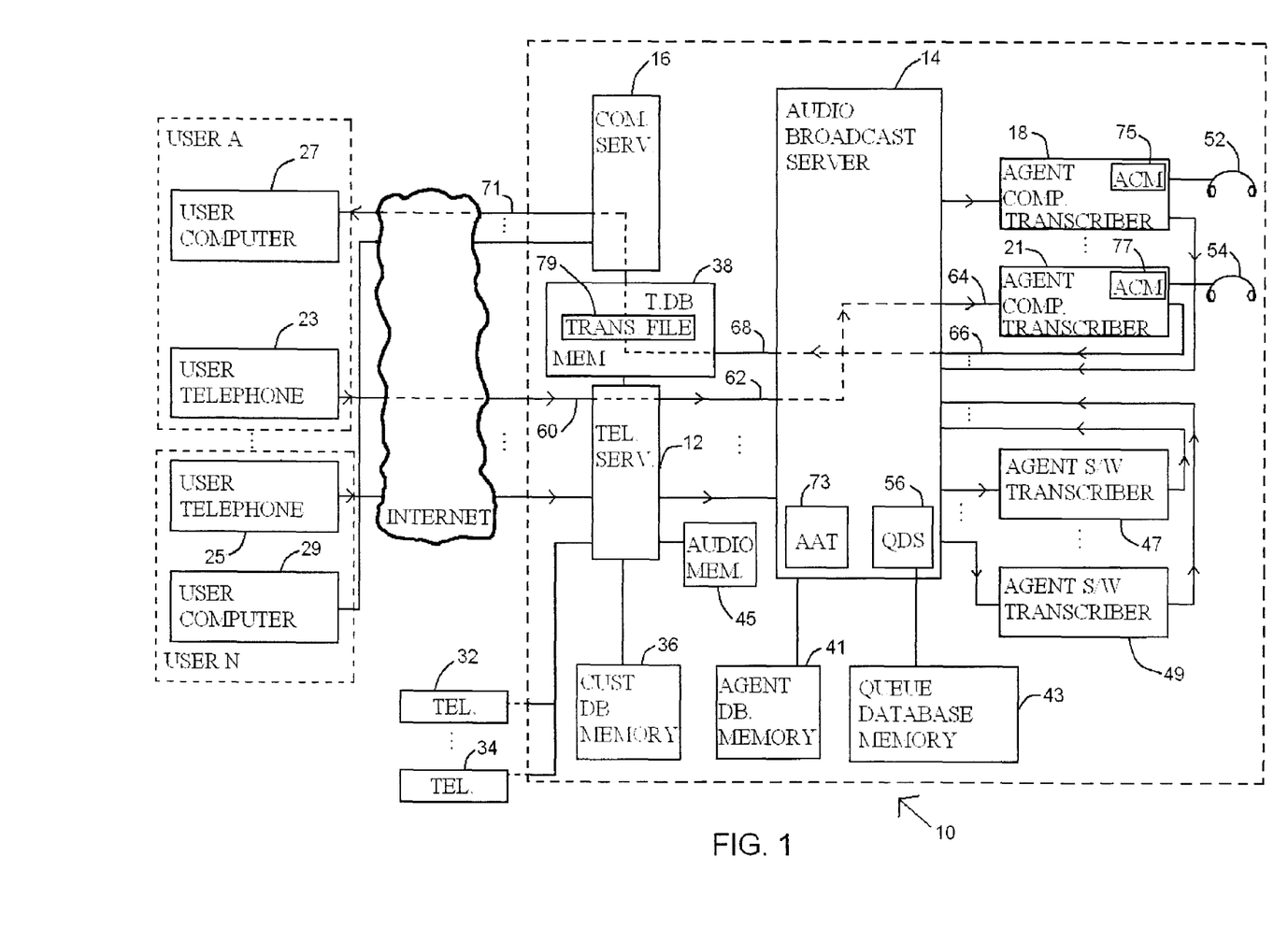
FIG. 1 is a block diagram of a transcription system according to an embodiment of the present invention.
Figure 2:
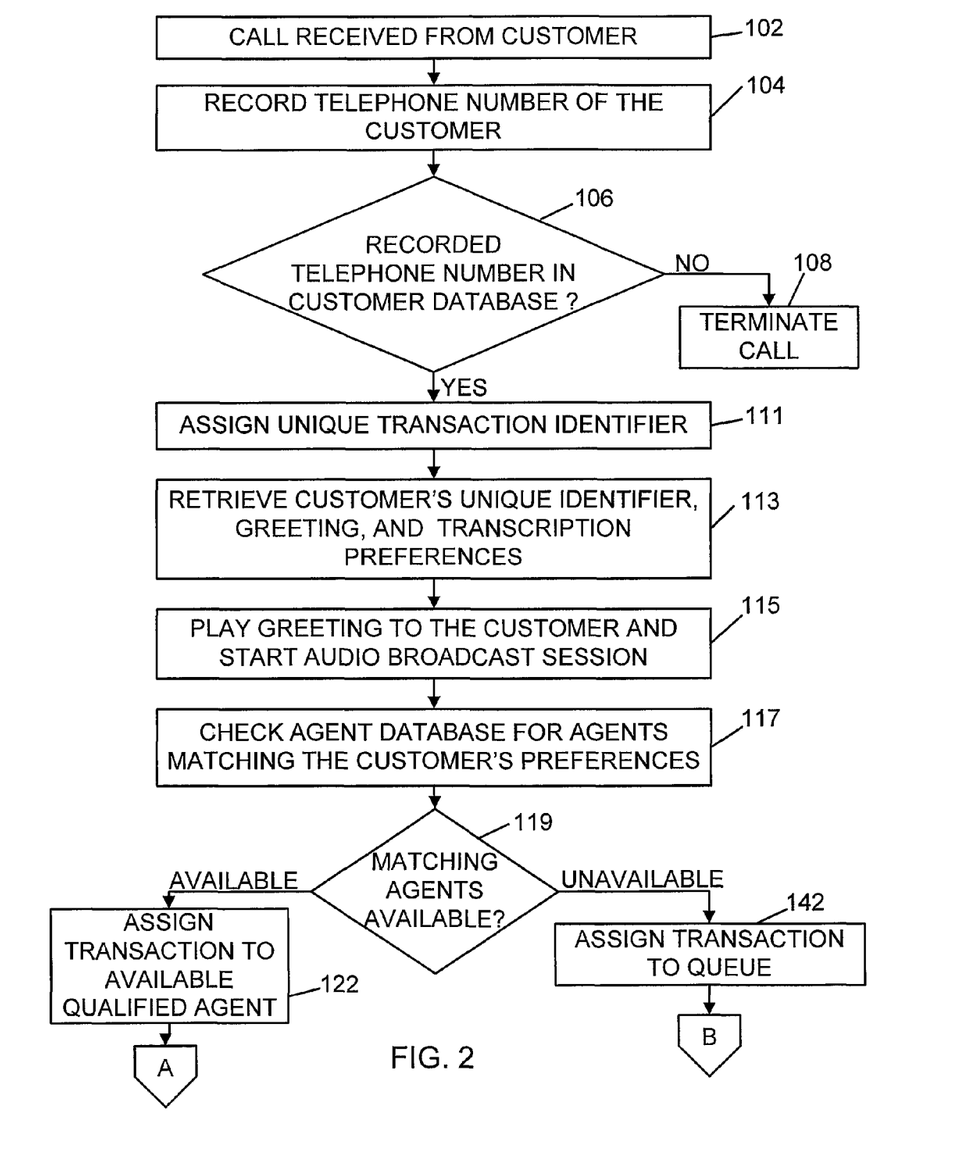
FIGS. 2-6 are flowchart diagrams of the transcription method utilized by the transcription system of FIG. 1.
Figure 3:
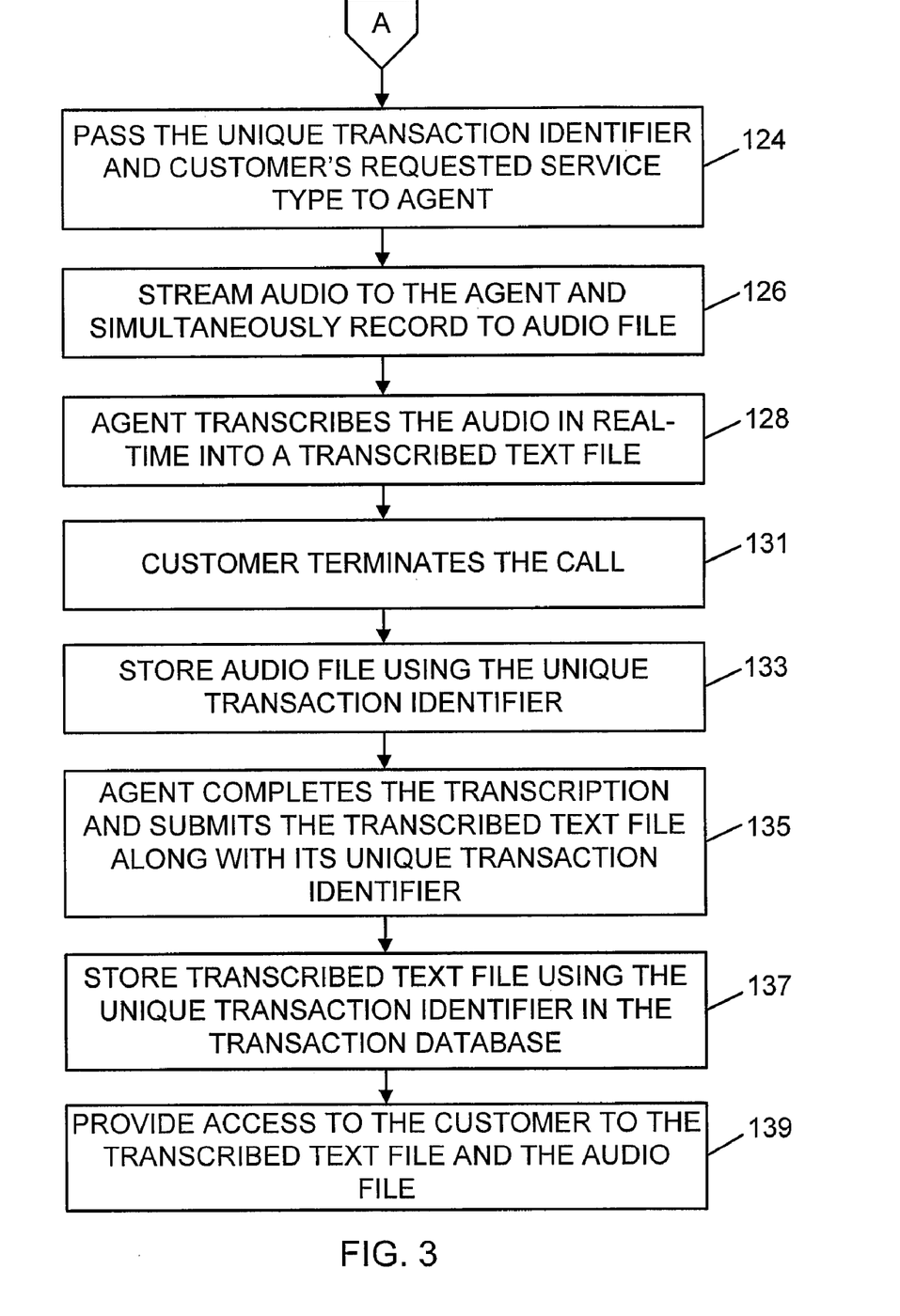
Figure 4:
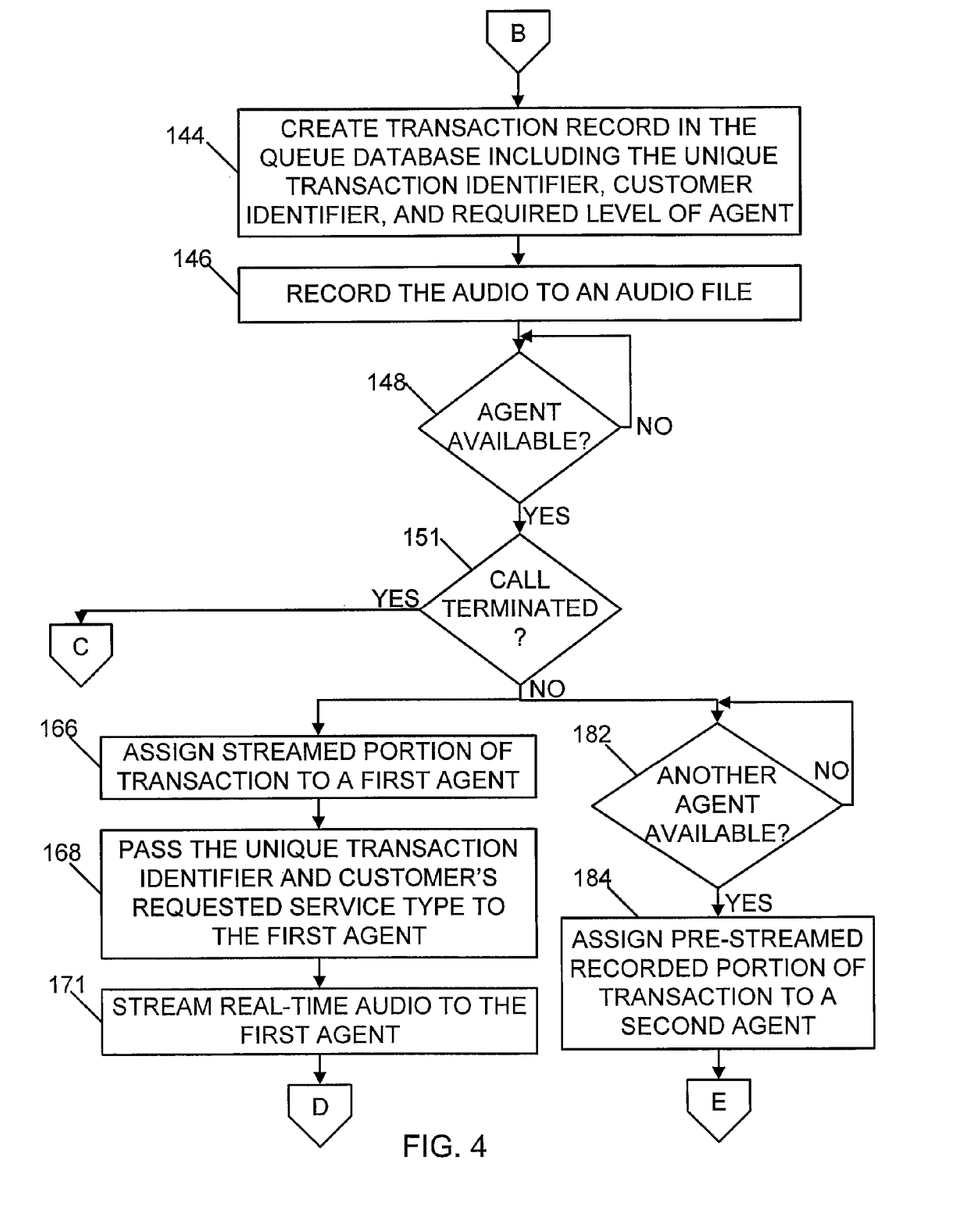
Figure 5:
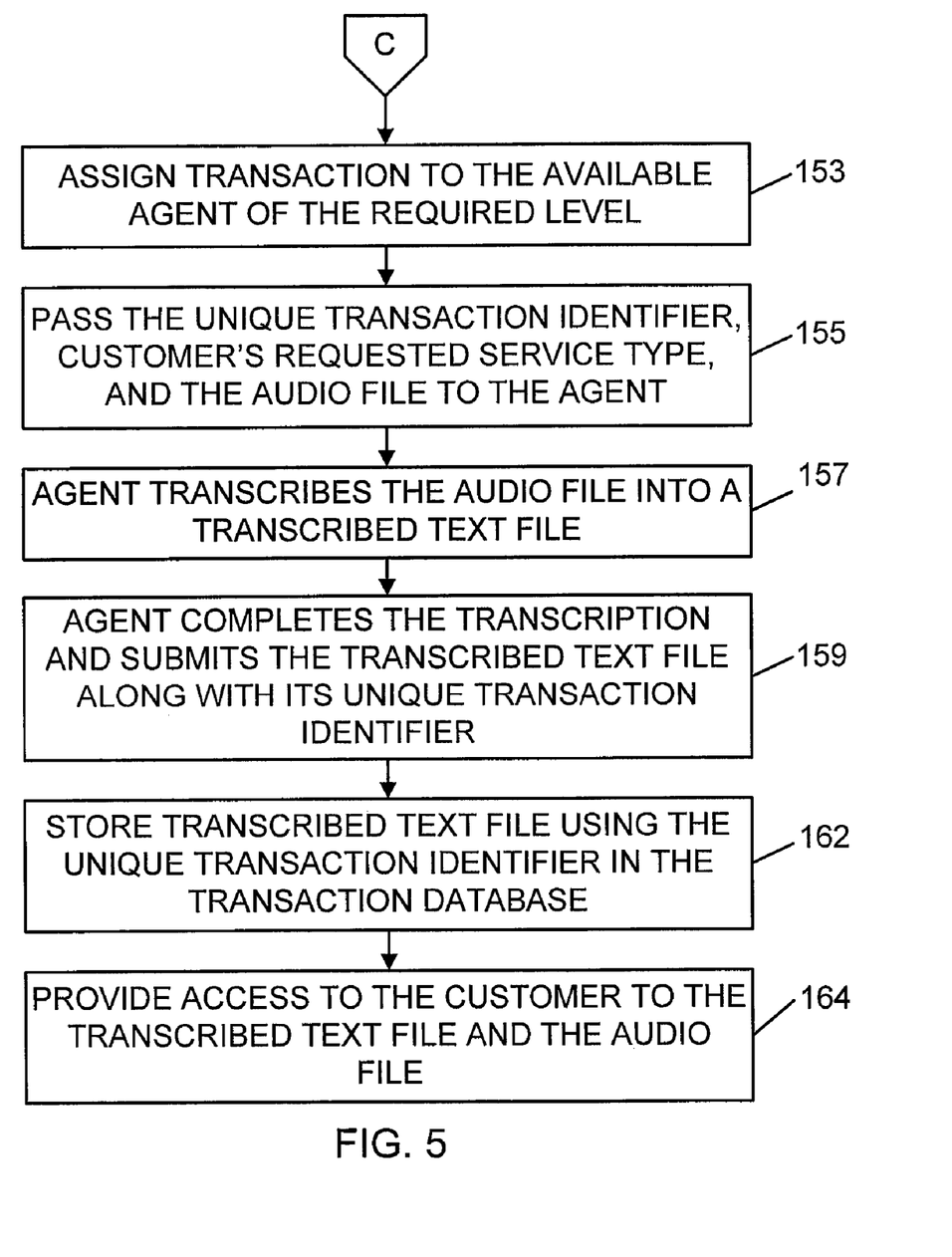
Figure 6:
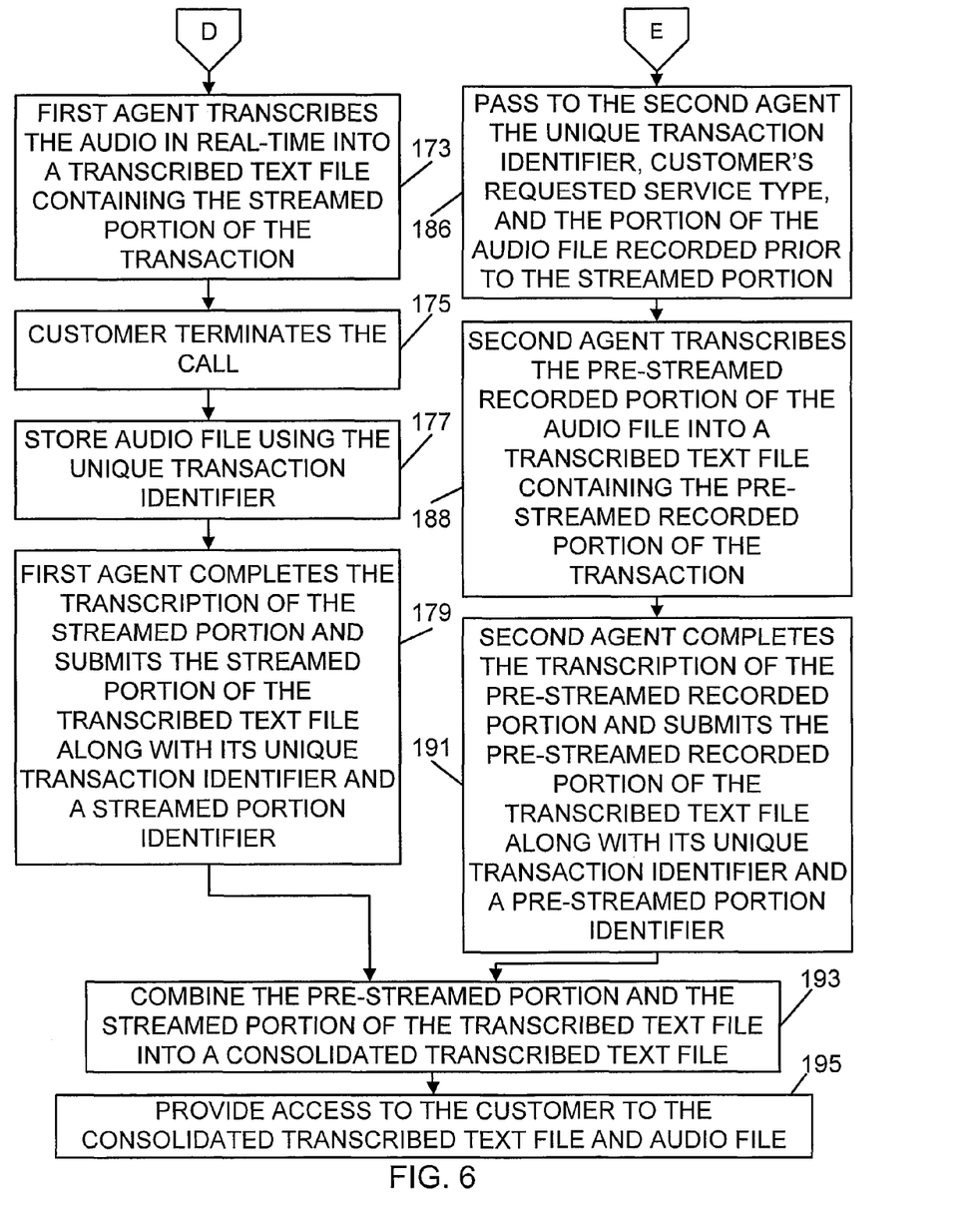

Referring now to FIG. 1, a transcription system, generally referenced as 10, may include a telephony server 12, a audio broadcast server 14, a computer server 16, and a group of agent transcribers including a group of agent computer transcribers 18, 21 and a group of agent software transcribers 47, 49. A plurality of user telephones 23, 27, 32, 34 may access the transcription system 10 via telephony server 12. Messages from the subscriber/users of these telephones may be provided to the transcription system 10 to be transcribed and returned via the computer server 16 to the appropriate user computer, such as a computer 25 for the user of the telephone 23 and a computer 29 for the user of the telephone 27.

The telephony server 12 may be a device with telephony software that accepts incoming telephone calls from Voice over Internet Protocol (VoIP) or public switched telephone network (PSTN) lines and allows multiple concurrent connections for the subscriber/users and individuals contacting the subscriber/user. User telephones 23 and 27 may access the telephony server 12 using VoIP over the Internet, and user telephones may access the telephony server 12 over PSTN lines. The telephony server 12 may interact with a customer database 36 for accessing customer information, a transaction database 38 for accessing transactional information, an audio memory 45 for storing audio files, and the audio broadcast server 14 for streaming incoming audio messages. See Table 1 for data that may be stored in the customer database 36, and Table 2 for data that may be stored in the transaction database 38.

TABLE 1

Customer Database

| Software Name | Description |
| --- | --- |
| customeruid | customer's unique identifier |
| customerusername | customer's user name |
| customerpassword | customer's password |
| customerfirstname | customer's first name |
| customerlastname | customer's last name |
| customeraddress | customer's address |
| customercity | customer's city |
| customerstate | customer's state |
| customeremail | customer's email address |
| smsemailaddress | customer's SMS email address |
| disk_usage | customer's disk usage |
| customerpin | customer's personal identification number (PIN) |
| emailpin | customer's email PIN |
| pricinglevel | customer's pricing level |
| defaultlanguageid | customer's default language identifier |
| timezone | customer's time zone |
| max_audio_time | customer's maximum audio time |
| default_transcription_service_type | customer's default transcription service type |
| customerphonenumber | customer's telephone number |

TABLE 2

Transaction Database

| Software Name | Description |
| --- | --- |
| transactionuid | transaction's unique identifier |
| customeruid | customer's unique identifier |
| transtitle | transaction's title |
| media_location | location of the audio file |
| file_size | size of the audio file |
| accesscount | number of times this record has been accessed |
| audio_length | length of audio file |
| inserted_time | time audio file was inserted |
| transcription_status | status of transcription (transcribed, waiting to be transcribed, failed, etc.) |
| cost | cost to perform this transcription |
| transcribed_text | transcribed text |

The audio broadcast server 14 may be located in a secure environment and have the group of agent transcribers connected to it using audio broadcast client software. The agent transcribers may be agent computer transcribers 18, 21 for use by transcription agents and/or agent software transcribers 47, 49 having voice recognition software. The audio broadcast server 14 may also interact with an agent database 41 for accessing information regarding the agents, the transaction database 38 for providing transcribed text files, and a queue database 43 for storing information regarding audio files that could not be transcribed in real-time. The audio broadcast server 14 may further include a job queue server 56 and an agent availability table 73 that may contain the availability status of the agents. See Table 3 for data that may be stored in the agent database 41, and Table 4 for data that may be stored in the queue database 43.

TABLE 3

Agent Database

| Software Name | Description |
| --- | --- |
| agentid | agent's unique identifier |
| agentname | agent's name |

TABLE 3-continued

Agent Database

| Software Name | Description |
| --- | --- |
| agentusername | agent's user name |
| agentpassword | agent's password |
| agentlevel | agent's level |

TABLE 4

Queue Database

| Software Name | Description |
| --- | --- |
| transactionuid | transaction's unique identifier |
| customeruid | customer's unique identifier |
| working_agent | agentid of agent working on the job |
| agentlevel | level of agent this will be assigned to |
| jobstatus | status of job = W: working; C: completed; F: failed; NULL: default |
| processed | has job been processed |
| queuepriority | priority of job |
| max_audio_transcription_time | maximum audio time from customer database |
| joberrorcode | error or success code returned by agent |
| timestamp_queue_in | time the job was placed in the queue |
| timestamp_queue_grab | time the job was assigned to an agent |
| timestamp_queue_completed | time the job was completed |
| working_time | amount of time the agent worked on job |
| languageid | language identifier |
| transtype | transcription service type |
| transtext | transcribed text |

The computer server 16 may provide the transcribed text files and associated audio files or notification of the availability of these file to the appropriate user via user computer 25, 29 by email, SMS, or a text message. The computer server 16 may alternatively or additionally provide the user access to the transcribed text files and associated audio flies using their user computer 25, 29 via a secure website.

The agent computer transcribers 18, 21 may receive streamed incoming audio messages from the audio broadcast server 14 in real-time. One of agent computer transcribers 18, 21 may provide the audio message to a transcription agent using a headset 52, 54 or some other suitable device. After completing the transcription of the audio message, the agent using the agent computer transcriber 18, 21 may provide the transcribed text file to the transaction database 38 via the audio broadcast server 14.

Alternatively, agent software transcribers 47, 49 may receive streamed incoming audio messages from the audio broadcast server 14 in real-time. The agent software transcribers 47, 49 may include voice recognition software that transcribes the audio message and provides the transcribed text file to the transaction database 38 via the audio broadcast server 14.

In use, assume a call is initiated by user A from user telephone 23 to the transcription system 10 to have an audio message transcribed. The call may proceed through the Internet and be connected via line 60 to the telephony server 12. The telephony server 12 may record the telephone number of the user telephone 23, and check that number against the customer telephone numbers in the customer database 36. If the telephone number matches one of the customer telephone numbers, the customer's unique identifier, greeting, transcription preferences, and other information may be passed to the telephony server 12 by the customer database 36. The telephony server 12 may also request and receive a unique transaction identifier from the transaction database.38. The telephony server 12 may then play the greeting back to the user telephone across line 60 and open an audio broadcast session with the audio broadcast server 14 via line 62.

The audio broadcast server 14 may receive the transaction identifier, the customer identifier, and the customer's transcription preferences from the telephony server 12. With the customer's transcription preferences, the audio broadcast server 14 may determine the level of the agent required to perform the transcription, and then search the agent database 41 to obtain a list of agents having this level. The audio broadcast server 14 may then check the agent availability table 73 to see if any of the agents on this list of agents is available. Assuming that the agent using the agent computer transcriber 21 was on the list of agents having the appropriate level from the agent database 41 and was listed as available in the agent availability table 73, the audio broadcast server may assign the transaction to the agent at the agent computer transcriber 21 and open a session on the agent computer transcriber 21 using the agent client module 77 via line 64. The audio broadcast server 14 may provide the transaction identifier, the customer identifier, and transcription instructions to the agent client module 77, which opens a window on the agent computer transcriber 21 that may include this information and a text box for the agent to enter the transcribed text. All of these actions may be completed during the time the telephony server 12 is playing the greeting to the user A.

Once the greeting is completed, the user A may begin entering his audio message. The audio message may travel from the user telephone 23 through the Internet and to the telephony server 12 via line 60. The telephony server 12 may then simultaneously digitally stream the real-time audio message to the audio broadcast server 14 and digitally record the audio message in the audio memory 45. The streamed real-time audio message may then be passed by the audio broadcast server 14 via line 64 to the agent computer transcriber 21, which may transmit the real-time audio message to the agent using the headset 54 or other suitable device. The agent may then in real-time begin entering the transcribed text into the text box provided by the agent client module 77.

When the user A completes his audio message and terminates the call, the telephony server 12 may terminate the streamed audio message and store the recorded audio message in an audio file in the audio memory 45 using the transaction identifier. When the streamed real-time audio messages ends, the agent may complete the transcription and submit the transcribed text file and the transaction identifier to the audio broadcast server 14 via line 66 using a "Submit" feature of the agent client module 77. The audio broadcast server 14 may then transmit the transcribed text file and the transaction identifier to the transaction database 38 via line 68, where the transcribed text file may be stored in a transcription file 79 using the transaction identifier. The transaction database 38 may also set a flag indicating that the transaction identified by this transaction identifier is complete.

Once the computer server 16 notices that the transaction is complete, the computer server 16 may access the transaction database 38 to retrieve the customer identifier, a copy of the transcribed text file, and the location of the audio file for this transaction identifier. The computer sever 16 may then access the audio memory 45 to retrieve a copy of the audio file and the customer database 36 to retrieve information about the customer including their email address. The computer server 16 may then create an email attaching a copy of the transcribed text file and a copy of the audio file, and send the email through the Internet via line 71 to the user computer 27 of user A. Since the transcription may be completed in real-time by the agent, this email may arrive at the user computer 27 very shortly after user A completes his audio message and terminates the call.

In operation, the transcription system and method may operate with reference to FIGS. 2-6 as follows for transcribing an audio message, such as a voicemail to a customer, dictation from the customer, or other audio messages to be transcribed. At box 102 a call from a customer may be received by the transcription system. This call may be made directly from the customer's telephone or be call forwarded from the customer's telephone. The telephone number of the customer may be recorded in box 104. For a call directly from the customer regarding dictation or other audio messages to be transcribed, when the customer calls the transcription system, the telephony server may pick up the line and record the telephone number of the customer using caller identification (callerID). For a voicemail, assume a call is placed to the customer's telephone number and is not answered. The unanswered call may then be call forwarded to the telephony server, which may pick up the line and record the telephone number of the person calling the customer and the telephone number of the customer forwarding the call using callerID.

The telephony server in box 106 may then check the customer database for the customer's telephone number. If the customer's telephone number does not exist in the customer database, the telephony server may terminate the call as shown in box 108. If the telephone number of the customer belongs to a customer listed in the customer database, the telephony server in box 11 may then contact the transaction database and receiver an assignment of a unique transaction identifier (transactionID) for this transaction, while the customer database in box 113 may return the unique customer identifier (customerID) and transcription settings (language, type of transcription, account balance, etc.).

In box 115, the telephony server may then play a greeting message to the user's telephone, such as "You have reached 619-819-xxxx, please leave a message", or other customer call-type specific configured greeting. While the greeting is playing, the telephony server may also open an audio broadcast session to the audio broadcast server. The audio broadcast session may transmit the unique transactionID, the customerID, and other customer preferences, such as language, type of transcription, or other. The audio broadcast server in box 117 may then determine the level of the agent required for this customer and check the agent database for a list of agents matching the customer's preferences. Once the list of qualified agents is obtained, the audio broadcast server may access the agent availability table to see if any of the agents on the list of qualified agents is available as shown in box 119.

If at least one qualified agent is available, the audio broadcast server in box 122 may assign the transaction to the available qualified agent and open a window on the agent's computer transcriber utilizing the agent client module that may include transaction specific information and a text box for entering the transcribed text. In box 124 the audio broadcast server may pass the transactionID, customerID, and other customer information, such as requested service type and other customer information, to the agent's computer transcriber so that it may be displayed in the window created by the agent client module. All of these actions may be completed prior to the end of the greeting message.

Once the greeting message is complete and the audio message from the user telephone begins, the audio message as shown in box 126 may be received by telephony server and digitally streamed in real-time through the audio broadcast server to the agent's computer transcriber. Simultaneously, the telephony server may be digitally recording the audio message in the audio memory. In box 128, the agent may then begin transcribing in real-time the streamed real-time audio message while listening to it through a headset or other suitable device. The person leaving the audio message may not be aware the agent is listening to his call.

In box 131, the customer may complete the audio message and terminate the call by hanging up the telephone. When the call has been terminated, the telephony server may terminate the streamed audio message and store the recorded audio message in an audio file using the transactionID as shown in box 133. Upon termination of the streamed real-time audio message, the agent in box 135 may complete the transcription and submit a transcribed text file containing the transcription along with the transactionID to the audio broadcast server using a "Submit" button provided by the agent client module running on the agent's computer transcriber.

In box 137, the audio broadcast server may store the transcribed text file using the transactionID in the transaction database and set a complete flag for this transactionID. When the computer server notices the set complete flag for this transactionID, the computer may access the transaction database, the customer database, and the audio memory to retrieve information regarding this transactionID, such as customerID, customer's email address, a copy of the transcribed text file, a copy of the audio file, and other information. With this information, the computer server may provide the customer access to the copy of the transcribed text file and the copy of the audio file as shown in box 139. The computer server may create an email attaching the copy of the transcribed text file and the copy of the audio file, and send it to the customer's computer. Alternatively, the computer server may notify the customer via an email, SMS, text message, or other method, that the transcription may be complete and that the customer may access a copy of the transcribed text file and a copy of the audio file on the transcription system's secure website using their username and password. Since the transcription may be completed in real-time by the agent, this email may arrive at the user's computer very shortly after the customer completes his audio message and terminates the call.

However, if at box 119 the audio broadcast server does not find any agents on the list of qualified agents available in the agent availability table, the audio broadcast server in box 142 may assign the transaction to the queue in the queue database. A transaction record may be created in the queue database including the transactionID, the customerID, the required level of agent required by the customer, and other information as shown in box 144. When the audio message commences after completion of the greeting message, the telephony server may begin to record the audio message in the audio memory under the transactionID.

In box 148, the queue database server may be continually checking the agent availability table for an available agent from the list of qualified agents. If no agent from this list is available, the queue database server may continue to check the agent availability table for an available qualified agent. If a qualified agent is available, the queue database server may then determine if the call has been terminated in box 151.

If the queue database server determines the call has been terminated, the queue database server in box 153 may assign the transaction to the available qualified agent and open a window on the agent's computer transcriber utilizing the agent client module that may include transaction specific information and a text box for entering the transcribed text. In box 155 the queue database server may pass the recorded audio file, transactionID, customerID, and other customer information, such as requested service type and other customer information, to the agent's computer transcriber so that it may be displayed in the window created by the agent client module.

In box 157, the agent may listen to the audio file using the agent computer transcriber through a headset or other suitable device, and then may transcribe the audio message in the audio file into the text box in the window of the agent computer transcriber. Upon completion of the transcription in box 159, the agent may submit a transcribed text file containing the transcription along with the transactionID to the audio broadcast server using a "Submit" button provided by the agent client module running on the agent's computer transcriber.

In box 162, the audio broadcast server may store the transcribed text file using the transactionID in the transaction database and set a complete flag for this transactionID. When the computer server notices the set complete flag for this transactionID, the computer may access the transaction database, the customer database, and the audio memory to retrieve information regarding this transactionID, such as customerID, customer's email address, a copy of the transcribed text file, a copy of the audio file, and other information. With this information, the computer server may provide the customer access to the copy of the transcribed text file and the copy of the audio file as shown in box 164. The computer server may create an email attaching the copy of the transcribed text file and the copy of the audio file, and send it to the customer's computer. Alternatively, the computer server may notify the customer via an email, SMS, text message, or other method, that the transcription may be complete and the customer may access a copy of the transcribed text file and a copy of the audio file on the transcription system's secure Website using their username and password.

However, if the queue database server in box 151 determines that the call has not been terminated, the queue database server in box 166 may assign the streamed portion of the transaction to the first available qualified agent and open a window on the first agent's computer transcriber utilizing the agent client module that may include transaction specific information and a text box for entering the transcribed text. In box 168 the queue database server may pass the a streamed portion identifier, transactionID, customerID, and other customer information, such as requested service type and other customer information, to the agent's computer transcriber so that it may be displayed in the window created by the agent client module.

The telephony server in box 171 may then begin streaming the real-time portion of the audio message through the audio broadcast server to the first agent's computer transcriber. In box 173, the first agent may then begin transcribing in real-time the streamed real-time audio message while listening to it through a headset or other suitable device.

In box 175, the customer may complete the audio message and terminate the call by hanging up the telephone. When the call has been terminated, the telephony server may terminate the streamed audio message and store the recorded audio message in an audio file using the transactionID as shown in box 177. Upon termination of the streamed real-time audio message, the agent in box 179 may complete the streamed portion of the transcription and submit the streamed portion of a transcribed text file containing the streamed portion of the transcription along with the transactionID and the streamed portion identifier to the audio broadcast server using a "Submit" button provided by the agent client module running on the agent's computer transcriber.

Simultaneously with the actions in boxes 166 through 179, the queue database server in box 182 may continually checking the agent availability table for a another agent from the list of qualified agents. When a second qualified agent is available, the queue database server in box 184 may assign the pre-streamed recorded portion of the transaction to the second available qualified agent and open a window on the second agent's computer transcriber utilizing the agent client module that may include transaction specific information and a text box for entering the transcribed text. In box 186 the queue database server may pass a pre-streamed portion identifier, the pre-streamed recorded portion of the audio file, transactionID, customerID, and other customer information, such as requested service type and other customer information, to the second agent's computer transcriber so that it may be displayed in the window created by the agent client module.

In box 188, the second agent may listen to the audio file using the agent computer transcriber through a headset or other suitable device, and then may transcribe the pre-streamed recorded portion of the audio message in the audio file into the text box in the window of the second agent's computer transcriber. Upon completion of the pre-streamed recorded portion of the transcription in box 191, the second agent may submit the pre-streamed recorded portion of the transcribed text file containing the pre-streamed recorded portion of the transcription along with the pre-streamed portion identifier and transactionID to the audio broadcast server using a "Submit" button provided by the agent client module running on the second agent's computer transcriber.

In box 193, the audio broadcast server may store the both the streamed and pre-streamed recorded portions using the transactionID in the transaction database and may combine the two portions to create a consolidated transcribed text file. The audio broadcast server may also store the consolidated transcribed text file in the transaction database using the transactionID and set a complete flag for this transactionID. When the computer server notices the set complete flag for this transactionID, the computer may access the transaction database, the customer database, and the audio memory to retrieve information regarding this transactionID, such as customerID, customer's email address, a copy of the consolidated transcribed text file, a copy of the audio file, and other information. With this information, the computer server may provide the customer access to the copy of the transcribed text file and the copy of the audio file as shown in box 195. The computer server may create an email attaching the copy of the consolidated transcribed text file and the copy of the audio file, and send it to the customer's computer. Alternatively, the computer server may notify the customer via an email, SMS, text message, or other method, that the transcription may be complete and the customer may access a copy of the consolidated transcribed text file and a copy of the audio file on the transcription system's secure website using their username and password. Since the streamed portion of the transcription may be completed in real-time by the first agent, this email may arrive at the user's computer very shortly after the customer completes his audio message and terminates the call, if the second agent becomes available and completes the transcription of the pre-streamed recorded portion before or shortly after the termination of the call.

After the completion of the greeting message, the telephony server may begin recording the audio message from the caller to an audio file (wav, mp3, etc.) and simultaneously stream the real-time audio of the message. When the caller disconnects, the telephony server may stop transmitting the real-time audio message and save the recorded audio file. The telephony server may then again contact the transaction database and send it the transactionID, the caller information, and the audio file. During this call, if the transaction database has no agent assigned to the transaction, meaning an agent was not available in real-time, the audio file may also be placed in the queue database.

The audio broadcast server may be located in a secure environment and may have agents connected to it using audio broadcast client software. The audio broadcast client software may be continuously polling the audio broadcast server awaiting new incoming audio broadcasts. When the audio broadcast server detects a new incoming audio stream, it may read the customer information from the stream and the unique transactionID. The audio broadcast server may then search the agent database for agents that meet the customer's preferences and assign the incoming audio stream to the next available agent that meets those preferences. The audio broadcast client software running on the agent's computer transcriber may then begin streaming the audio stream, so that the agent can begin transcribing in real-time.

The queue database may organize both live audio streams to be transcribed and recorded audio to be transcribed. The job queue server may manage pending jobs and assigns them to available agents. The client software may be either permanently connected to the job queue server or connects every few seconds to check for the availability of new jobs.

The client software may display instructions on the agent's screen and provide the agent with a text box to enter the transcribed text. The client software may alter the transaction database of the transaction that an agent is currently working on. When the session has ended, the agent may then click a "Submit" button, which connects the client software to the transaction database and transmits the transcribed text to the appropriate transaction record based on the unique transactionID and flagged as complete.

For the audio files that could not be transcribed in real-time, the queue database may be polled by the client software, and the audio file at the top of the queue may be assigned to the next available appropriate agent. The entire audio file may then be sent to the agent to be transcribed. When the agent has finished the transcription, the transcribed text file may be transmitted to the transaction database and flagged as complete.

Once the transaction is flagged as complete, the computer server may notify the customer with an email, SMS, text message, or other that the transcribed text file may be complete and available to access along with the associated audio file on the secure website. Alternatively, the computer server may provide the transcribed text file and the associated audio file in an email to the customer.

In addition to transcription, the transcription system and method may also allow audio messages to be translated to other languages or have closed captioning added. Additionally, the system and method may permit reversing the process to convert the transcription of a text file into an audio file.

While particular embodiments of the present invention have been disclosed, it is to be understood that various different modifications are passing and one contemplated within the true spirit and scope of the appended claims. There is no intention, therefore, of limitations to the exact abstract or disclosure herein presented.

What is claimed is:

1. A transcription method for facilitating the transcription of audio messages by a group of agent transcribers, comprising:
   receiving an audio message from a customer via a telephone;
   determining whether one of the agent transcribers is available;
   storing the audio message when an agent transcriber is not available;
   continuing to determine whether a transcriber is available;
   streaming in real time a streamed portion of the audio message to a first available agent transcriber for facilitating the transcription of the streamed portion of the audio message into a first portion of a transcription text file;
   providing subsequently a pre-streamed recorded portion of the audio message to a subsequently available second agent transcriber for facilitating the transcription of the pre-streamed recorded portion of the audio message into a second portion of the transcription text file while the streaming in real time is continuing with the first agent transcriber; and
   combining the first and second portions of the transcription text file into a consolidated text file.

2. A transcription method according to claim 1, further including providing access to the consolidated text file for the customer.

3. A transcription method according to claim 2, further including determining whether the customer is authorized to obtain the transcription.

4. A transcription method according to claim 3, further including assigning a unique transaction identifier to the audio message when the customer is determined to be authorized.

5. A transcription method according to claim 4, further including playing a greeting for the customer.

6. A transcription method according to claim 5, further including matching agent transcribers preferences with the customer preference.

7. A transcription method according to claim 6, further including storing the audio message in an audio file.

8. A transcription method according to claim 7, further including providing access to the audio file for the customer.

9. A transcription method according to claim 8, further including determining whether the customer terminated the call in response to an agent transcriber becoming available.

10. A transcription method according to claim 9, further including passing the entire recorded audio message file to an available agent transcriber.

11. A transcription method according to claim 10, further including passing a unique transaction identifier, customer's requested service type and the audio file to one of the agent transcribers.

12. A transcription system for facilitating the transcription of audio messages by a group of agent transcribers, comprising:
   means for receiving an audio message from a customer via a telephone;
   means for determining whether one of the agent transcribers is available;
   means for storing the audio message when an agent transcriber is not available;
   means for continuing to determine whether a transcriber is available;
   means for streaming in real time a streamed portion of the audio message to a first available agent transcriber for facilitating the transcription of the streamed portion of the audio message into a first portion of a transcription text file;
   means for providing subsequently a pre-streamed recorded portion of the audio message to a subsequently available second agent transcriber for facilitating the transcription of the pre-streamed recorded portion of the audio message into a second portion of the transcription text file while the streaming in real time is continuing with the first agent transcriber; and means for combining the first and second portions of the transcription text file into a consolidated text file.

13. A transcription system according to claim 12, further including means for providing access to the consolidated text file for the customer.

14. A transcription system according to claim 13, further including means for determining whether the customer is authorized to obtain the transcription.

15. A transcription system according to claim 14, further including means for assigning a unique transaction identifier to the audio message when the customer is determined to be authorized.

16. A transcription system according to claim 15, further including means for playing a greeting for the customer.

17. A transcription system according to claim 16, further including means for matching agent transcribers preferences with the customer preference.

18. A transcription system according to claim 17, further including means for storing the audio message in an audio file.

19. A transcription system according to claim 18, further including means for providing access to the audio file for the customer.

20. A transcription system according to claim 19, further including means for determining whether the customer terminated the call in response to an agent transcriber becoming available.

21. A transcription system according to claim 10, further including means for passing the entire recorded audio message file to an available agent transcriber.

22. A transcription system according to claim 21, further including means for passing a unique transaction identifier, customer's requested service type and the audio file to one of the agent transcribers.

* * * * *